Figure 1:
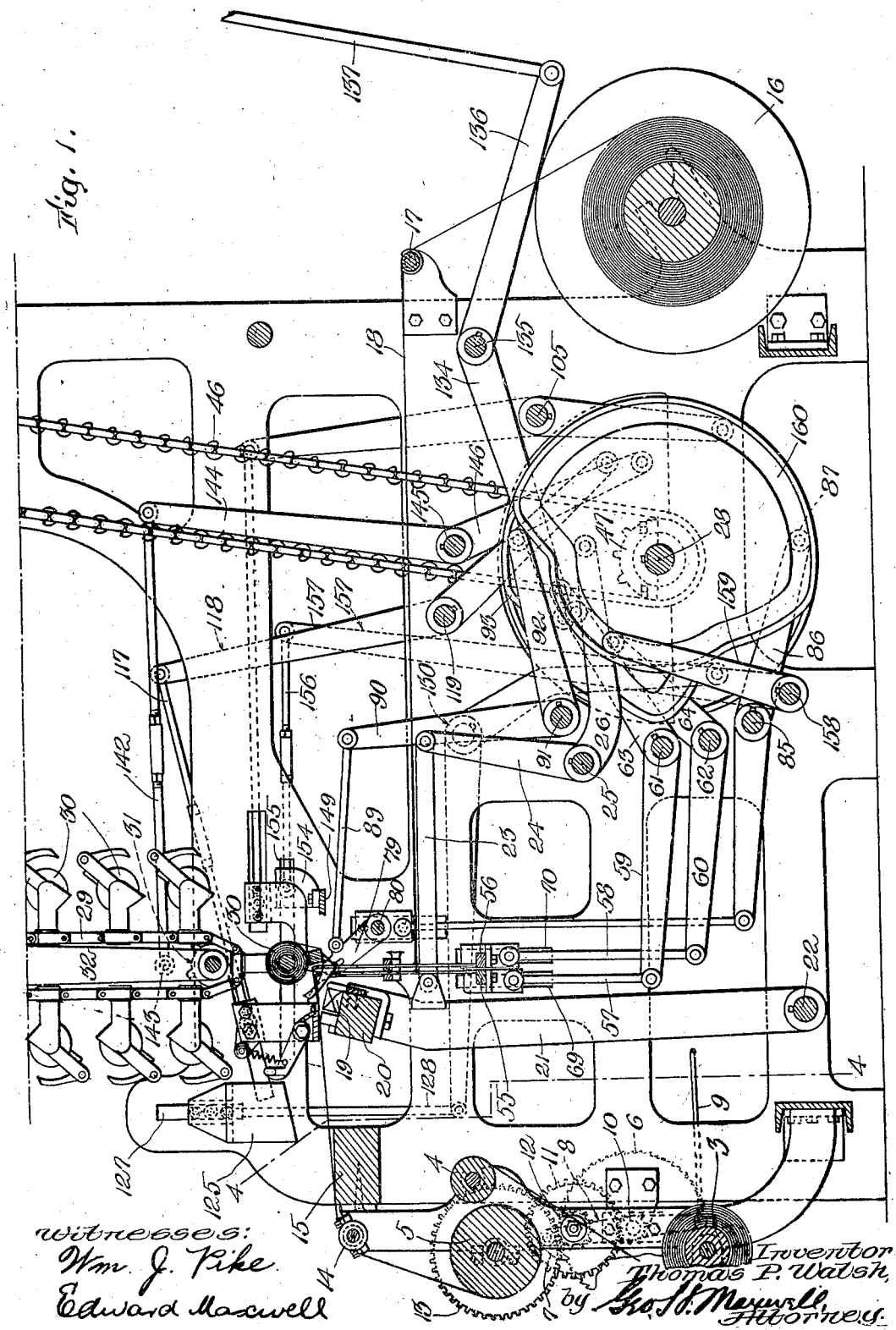

T. P. WALSH.
LOOM FOR WEAVING ORIENTAL KNOTTED FABRICS.
APPLICATION FILED AUG. 18, 1910.

1,072,885.

Patented Sept. 9, 1913
9 SHEETS—SHEET 1.

Witnesses:
Wm. J. Pike
Edward Maxwell

Inventor
Thomas P. Walsh,
by Geo. S. Maxwell
Attorney.

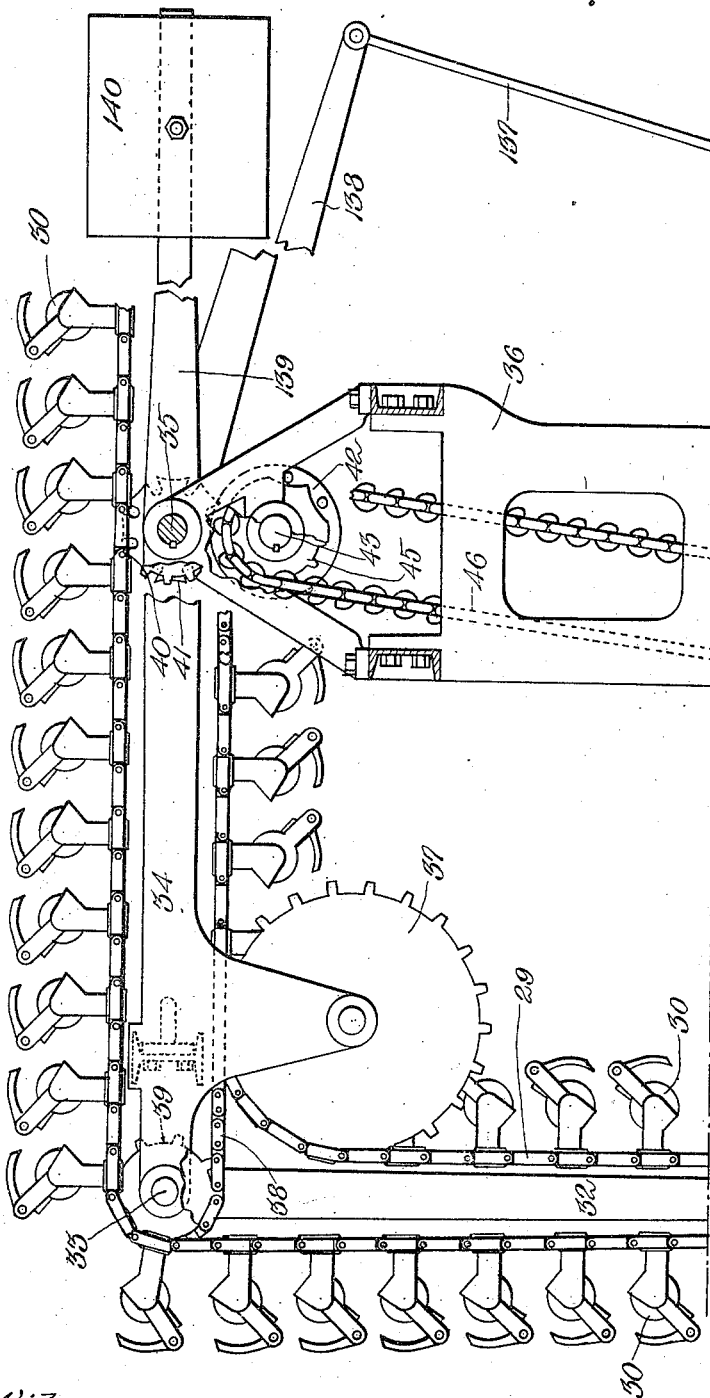

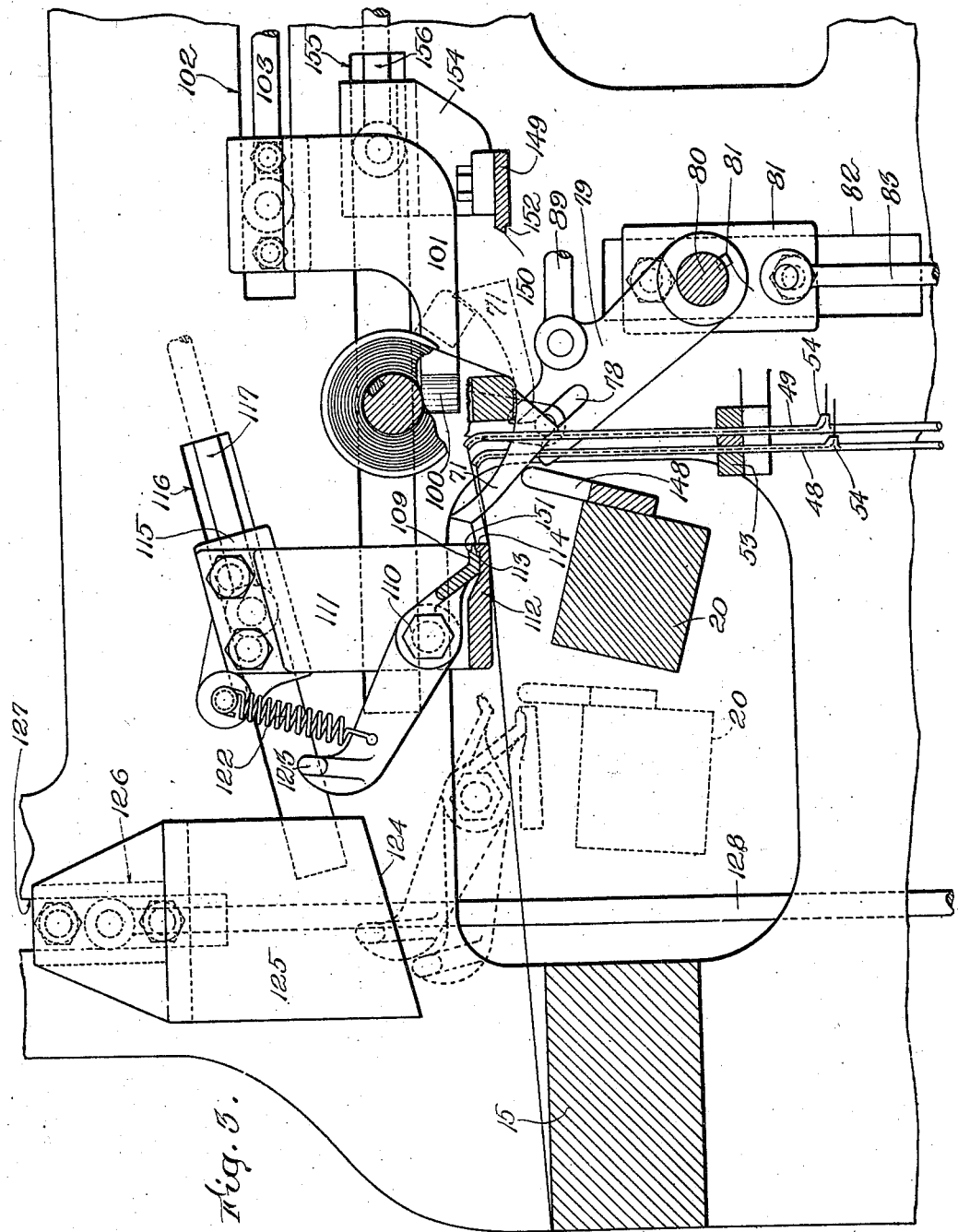

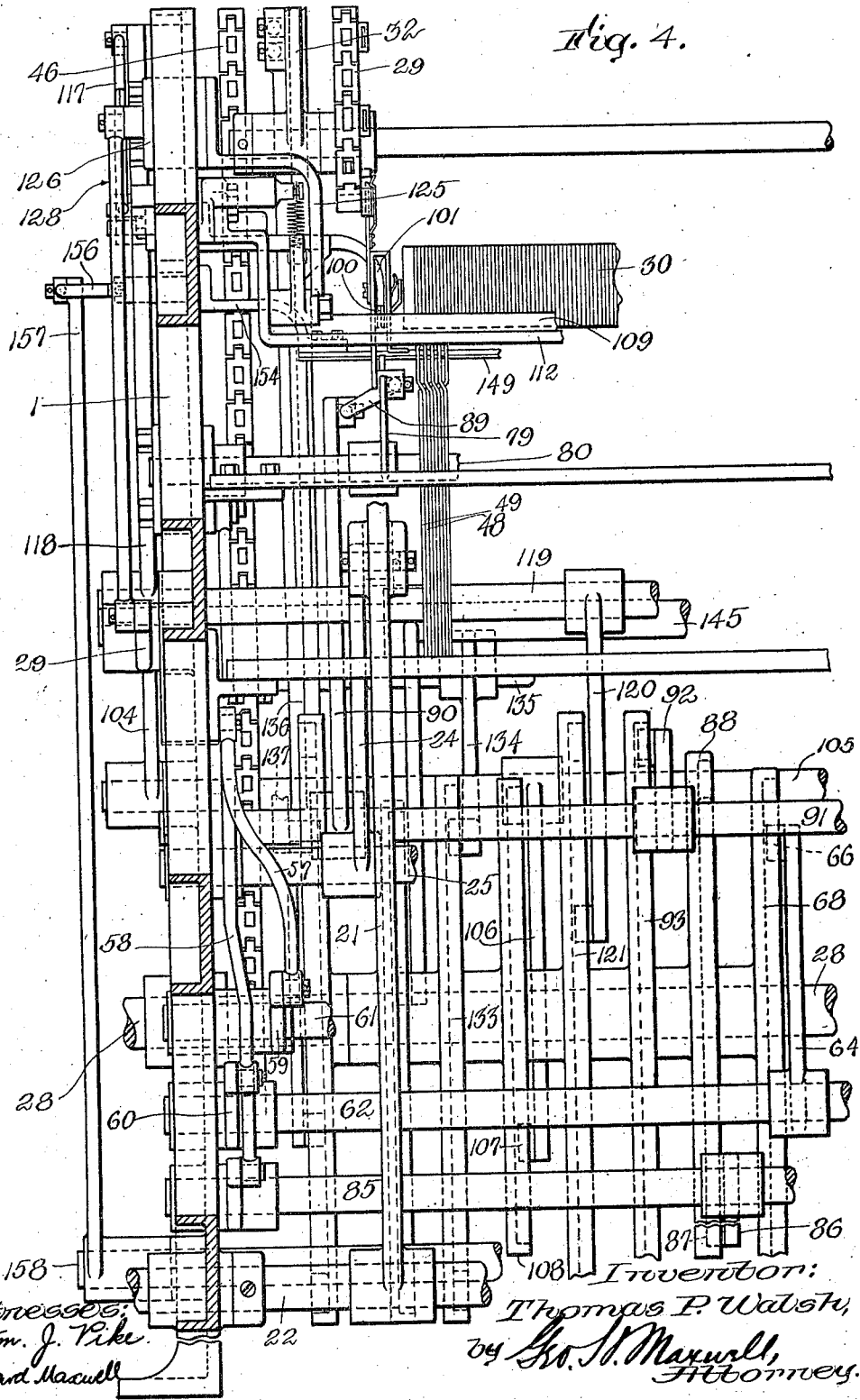

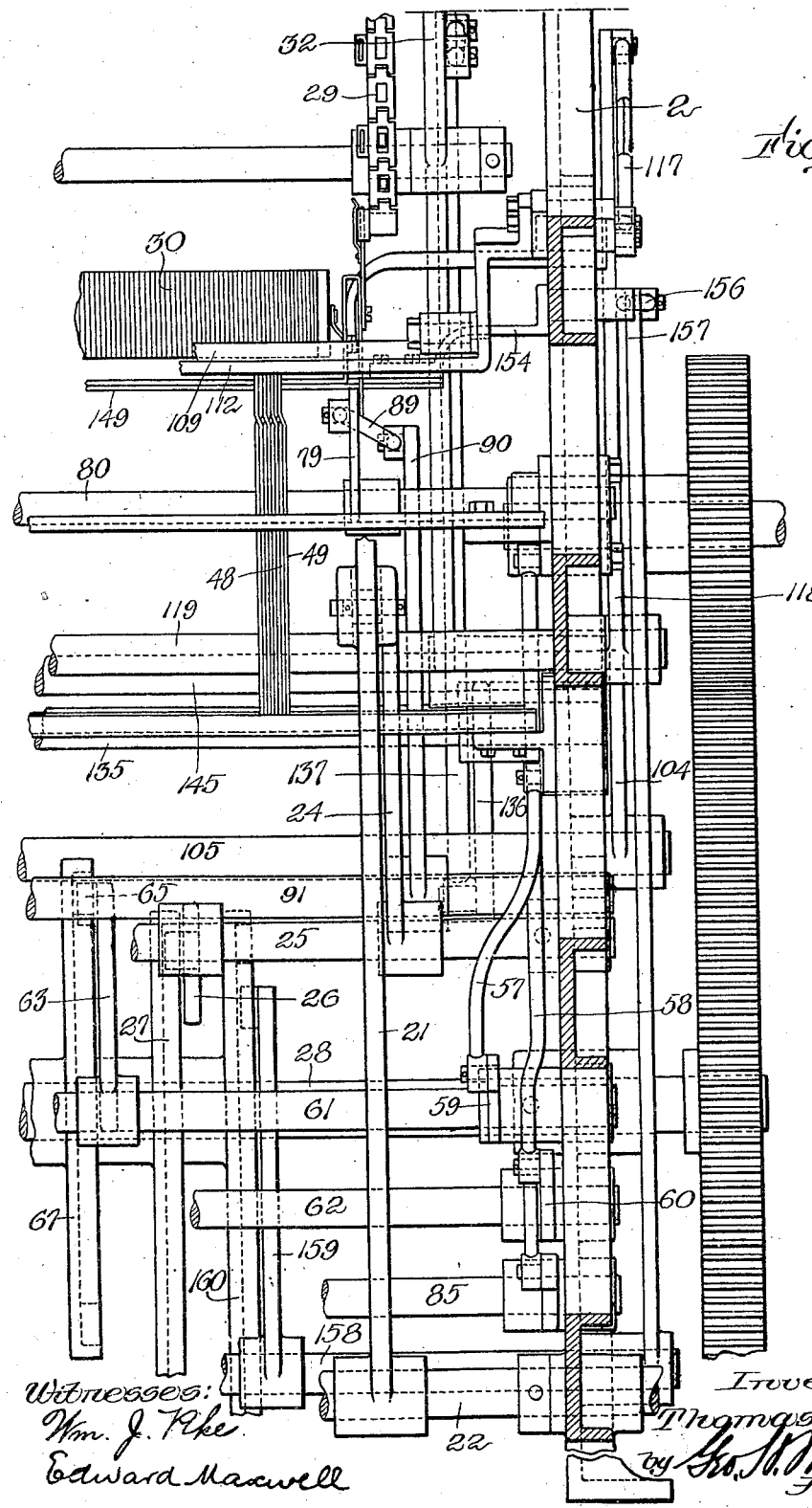

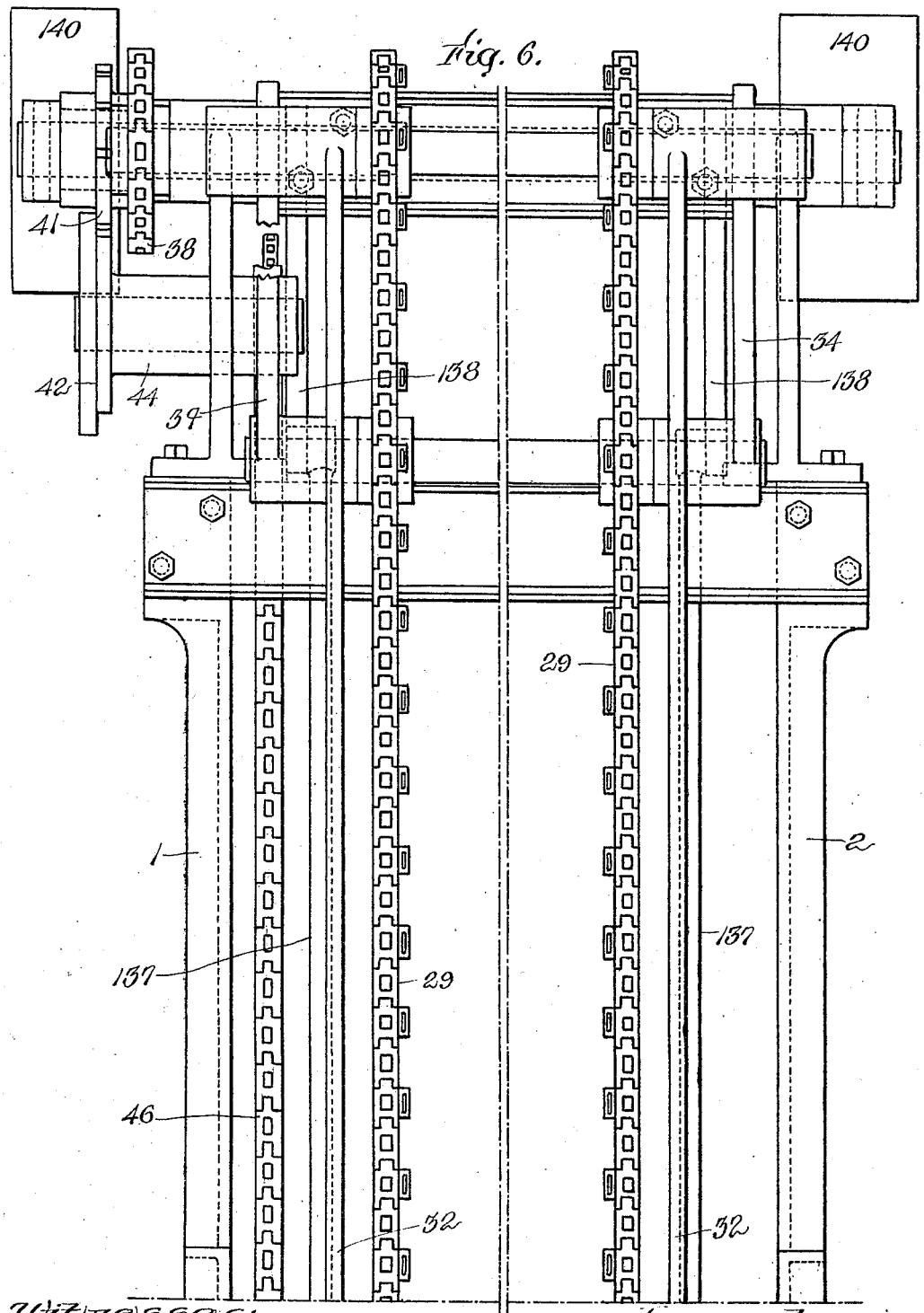

T. P. WALSH.
LOOM FOR WEAVING ORIENTAL KNOTTED FABRICS.
APPLICATION FILED AUG. 18, 1910.
1,072,885.
Patented Sept. 9, 1913.
9 SHEETS—SHEET 7.
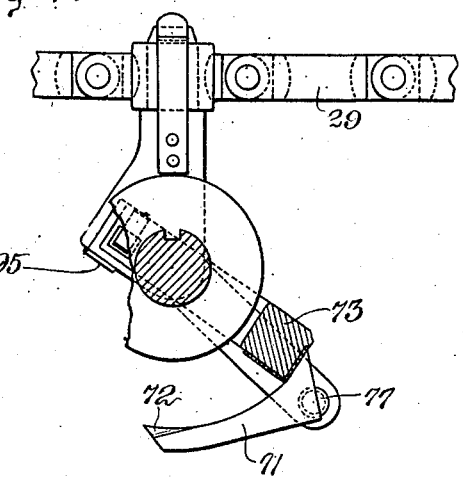
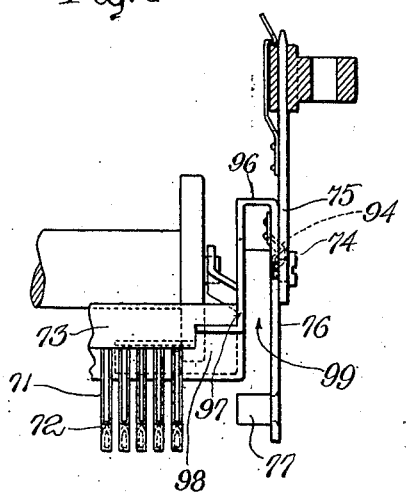
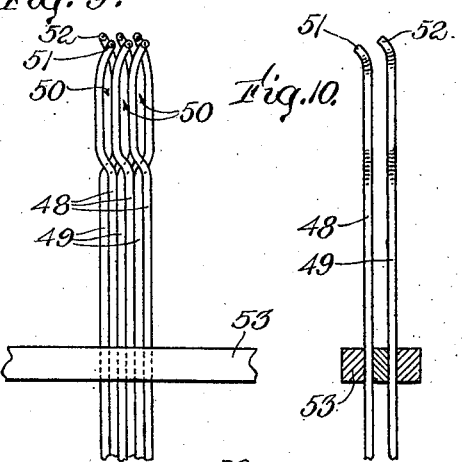
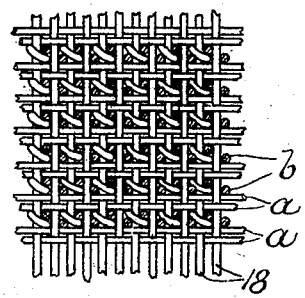
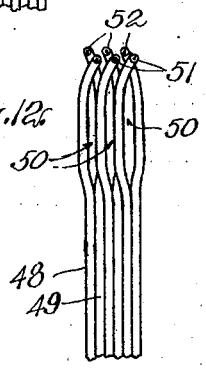
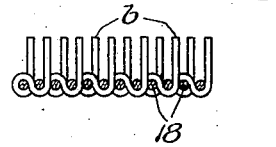
Witnesses:
Wm. J. Pike.
Edward Maxwell
Inventor:
Thomas P. Walsh,
by Geo. H. Maxwell,
Attorney.

T. P. WALSH.
LOOM FOR WEAVING ORIENTAL KNOTTED FABRICS.
APPLICATION FILED AUG. 18, 1910.
1,072,885.
Patented Sept. 9, 1913.
9 SHEETS—SHEET 8.
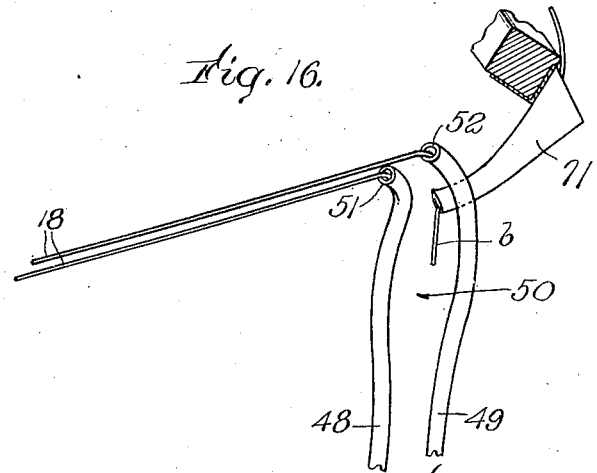
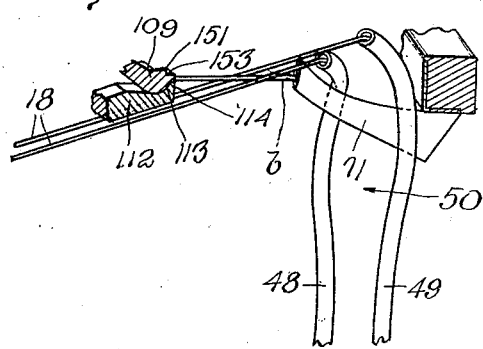
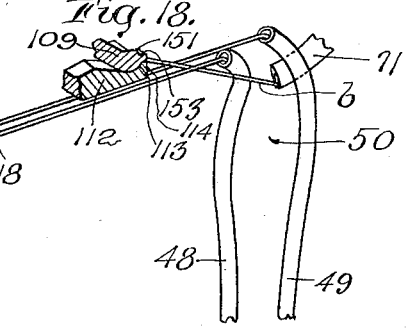
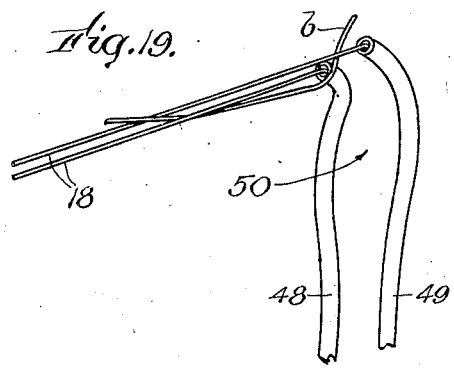
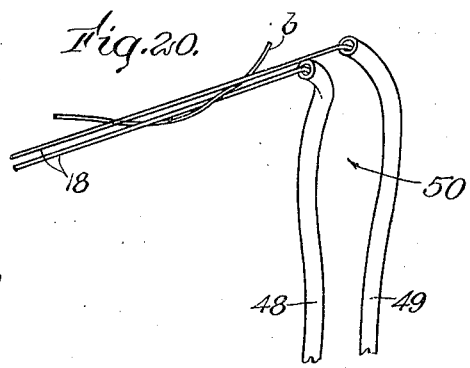
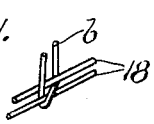
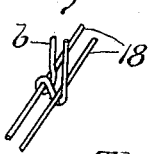

T. P. WALSH.
LOOM FOR WEAVING ORIENTAL KNOTTED FABRICS.
APPLICATION FILED AUG. 18, 1910.
1,072,885.
Patented Sept. 9, 1913.
9 SHEETS—SHEET 9.
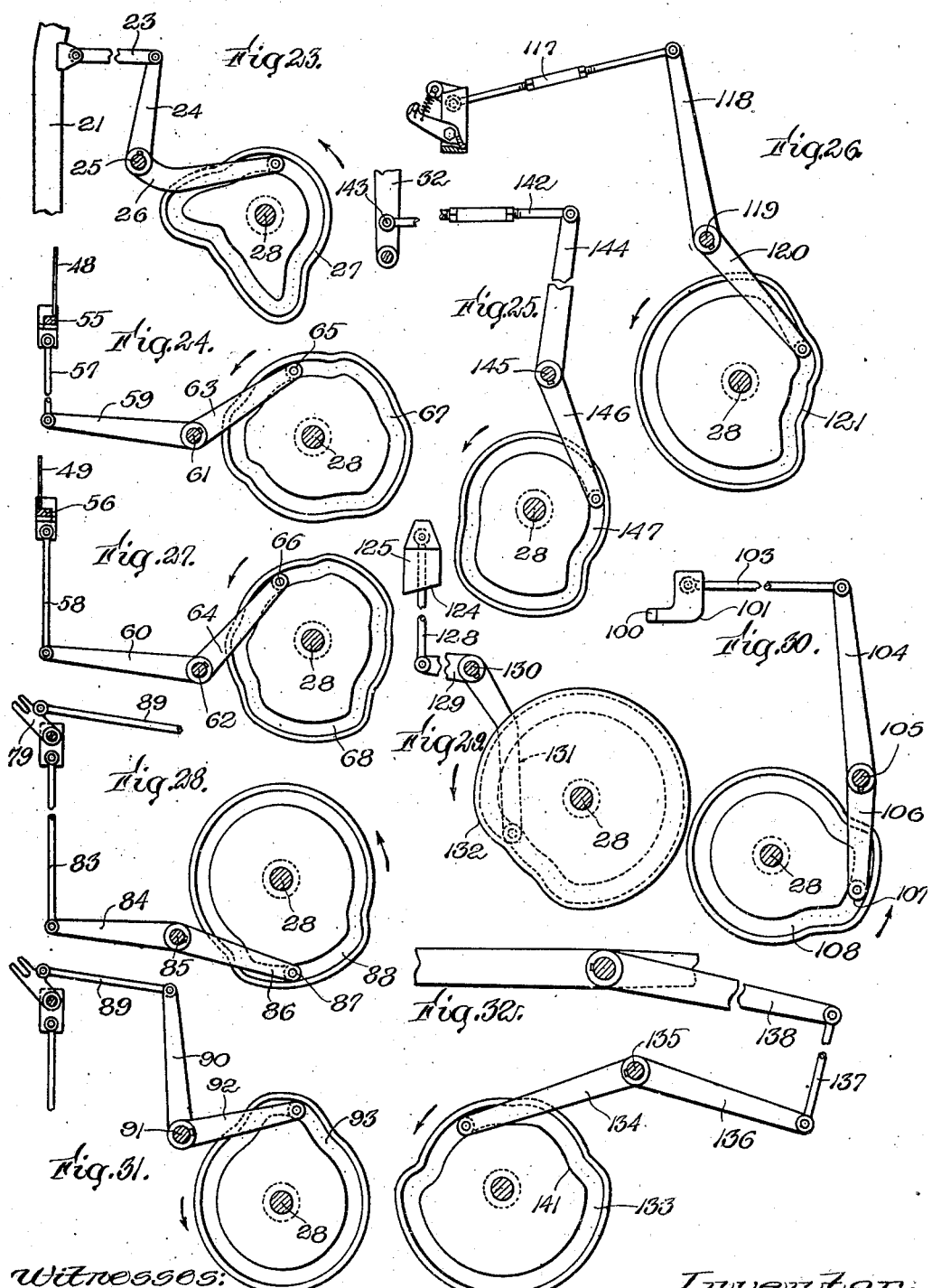

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

LOOM FOR WEAVING ORIENTAL KNOTTED FABRICS.

1,072,885.  Specification of Letters Patent.  Patented Sept. 9, 1913.

Application filed August 18, 1910. Serial No. 577,838.

*To all whom it may concern:*

Be it known that I, THOMAS P. WALSH, a citizen of the United States, and resident of Boston, in the county of Suffolk and State of Massachusetts, have invented an Improvement in Looms for Weaving Oriental Knotted Fabrics, of which the following description, in connection with the accompanying drawings, is a specification, like letters on the drawings representing like parts.

The object of my invention is to produce a loom which will weave an oriental rug, carpet, or other oriental knotted fabric with extreme rapidity and efficiency, and which, besides being simple in its knotting mechanism and certain in its knotting and weaving movements, is capable of handling a practically unlimited number of colors, preferably after the manner of Axminster and Moquette weaving.

In the so-called Axminster loom, spools of yarns are brought into weaving position, one for each row of pile loops or picks of pile, said spools being carefully wound in accordance with the requirements of the pattern, all as well known in this art. Accordingly, this feature of my invention resides in providing means as hereinafter claimed for knotting or positively interlocking in the form of an oriental knot the pile yarns as they are brought around by the Axminster spools. Still referring to this feature, the invention is new in providing means for knotting the pile threads around the warp threads at one forward movement. Also, the weaving is accomplished without removing the spools from the carrier chain.

My invention, however, in its broader aspects, is not limited to the utilization of Axminster spools, but includes knot-forming mechanism for coiling a color yarn about two ground warp threads to form an oriental knot, in connection with means for supporting the ground warp threads for weaving, said two mechanisms containing means for forming the bends for said knot in the body of the color yarn back from and independent of the ends of said yarn.

My invention is also new in providing, in connection with the aforesaid, means for positively holding the color yarn on both sides of the body portion where the knot is being formed while said knot is being thus formed. Preferably I lay the color yarn lengthwise of two approximately parallel ground warp threads and provide mechanism to move said color yarn to the fell and simultaneously coil the same about said two ground warp threads in oriental-knot formation.

A further advantage of my invention resides in accomplishing the knotting operation with one weaving movement, and also preferably the entire row transversely of the loom is woven or knotted simultaneously, and preferably without stopping the loom between the knotting operation and the binding operation. Preferably also each row of piles is held by its ends at the fell and sheared evenly as it is woven.

Among the further novel features of my invention are the provision of tubular holders through which the threads pass and means for shifting said holders and thereby shifting the threads in accordance with the shedding and other weaving requirements, a knot positioner to move the knot to the fell (said positioner being preferably the tube of the spool, in the preferred Axminster-spool embodiment of my invention).

Various other features of my invention will be referred to and fully described in the following detailed description, taken with reference to the accompanying drawings, in which I have shown the preferred embodiment of my invention above mentioned.

In the drawings, Figures 1 and 2 are longitudinal sectional views (parts being broken away) of my loom, Fig. 1 showing the lower part and Fig. 2 the upper part thereof; Fig. 3 is a sectional detail of the knot-forming portion of the mechanism shown in Fig. 1, considerably enlarged; Figs. 4, 5, and 6 are cross sectional views taken on the line 4—4, Fig. 1, showing the knotting mechanism and coöperating parts of the loom in front elevation, Figs. 4 and 5 showing respectively the left-hand and right-hand ends of the lower part of the loom, and Fig. 6 the corresponding parts of the upper portion of the loom; Figs. 7 and 8 are views respectively in transverse and longitudinal section of a portion of the Axminster spool, carrier chain, and tube frame; Figs. 9, 10, and 11 are views respectively in front elevation, side elevation, and top plan of the ground-warp-thread holders and color-thread-twisting devices; Fig. 12 is a view in front elevation of a slightly different form of ground-warp-thread holder; Figs. 13, 14, and 15 show respectively in horizontal section and vertical section the weave, Fig. 13 being substantially a top plan view, Fig. 14 a vertical sectional view showing the binder filling threads around the warp threads, and Fig. 15 a similar sectional view showing the tufts and pile knots around said warp threads; Figs. 16-20 are perspective views showing the successive positions of portions of the knot-forming mechanism; Figs. 21 and 22 are perspective views of the knot viewed from opposite directions; and Figs. 23-32 are fragmentary sectional views showing in side elevation the various cams and connections for operating the different parts of the loom, Fig. 23 for the beating-up movement, Fig. 24 for raising the forward set of warp-thread holders, Fig. 25 for swinging the spool carrier, Fig. 26 for operating the nipper bar and shear, Fig. 27 for operating the rear set of said warp-thread holders, Fig. 28 for raising and lowering the tube-frame swinging mechanism, Fig. 29 for opening the jaws of the nipper at the fell, Fig. 30 for positioning the spools and tube frames, Fig. 31 for swinging the tube frame, and Fig. 32 for raising and lowering the spool chain.

Mounted in suitable end frames 1, 2 at the front of the loom is any usual kind of take-up mechanism 3, 4, 5, 6, 7, 8, 9, 10, 11, 12, 13, guide roll 14, and breast beam 15, and at the rear end of the loom is a usual warp beam 16 and whip roll 17 for delivering the ground warp threads 18. The shuttle mechanism may be of any usual or preferred kind and hence, as with various other features of the loom, is not shown in elaborate detail, the shuttle 19 (for laying binder filling a) being herein shown as mounted on a usual lay 20 supported on lay swords 21 fast on a rocker shaft 22 pivoted in the end frames and actuated by usual links 23, arms 24, rock shaft 25, cam lever 26, and cam 27 on the cam shaft 28. While the color yarns b may be supplied from any suitable source, when considering my invention in its broader aspects, I prefer and therefore have shown the supply of color yarns as derived from Axminster spools, which, it will be understood, are provided with the various complements of color yarns required according to the pattern. The spool carrier chain (or, more properly, chains) 29, carrying a series of spools 30, passes over sprocket wheels 31 at the lower end of a swinging frame 32 pivoted at 33 on the forward end of a top horizontal frame 34 fast on a rock shaft 35 journaled in the upper portions 36 of the end frames 1, 2. Said chain is guided over guide sprockets 37 and is driven by a sprocket chain 38 passing over sprocket wheels 39 and 40, the latter being loose on the shaft 35 and immovably connected with a star wheel 41 operated by a pin wheel 42 fast on a shaft 43 journaled in a bearing 44 (Fig. 6) and itself actuated by a sprocket wheel 45, chain 46 and sprocket wheel 47 on the cam shaft 28. As herein shown, in this preferred embodiment of my invention, the twisting or coiling of the previously selected and wound color yarns around the ground warp threads is accomplished as the color yarns from the spools are being moved forward to the fell. This coiling or twisting takes place back from the free ends of said color yarns, as distinguished, for instance, from leading the free ends around the ground warp threads.

Among the broadly novel features of my invention, which makes the mechanism extremely simple, efficient, and practical is the provision of means for accomplishing this coiling or knotting of the color yarn about the ground warp threads by passing the yarn between the two warp threads with which it is to be knotted and then coiling it around said threads entirely back from the free end of the color yarn while the latter is still intact with the supply body, as distinguished from moving the free end thereof around or about the ground warp threads or weaving with a severed fragment of yarn. In other words, while the color yarn is held at its two ends (one end in nippers, as will presently be described, and the other end upon the spool), I put the coils or twists into it between said ends, which results in its being knotted properly about the ground warp threads. Preferably this is accomplished while the two ground warp threads with which it is to be knotted are held stationary, and this holding of the two warp threads stationary in such a manner that they can coöperate with the above mentioned movement of the color thread to produce the desired oriental-knot weave constitutes a second broadly novel feature of the invention. The preferred means for holding the ground warp threads stationary in such a manner as to produce, in connection with the forwardly drawn color yarn, a coiling or twisting of the latter about the ground warp threads, consists of two ground-warp-thread holders, which hold the warp threads in such a position that when the color yarn (from the spool or whatever source of color yarn supply is provided) is passed (by the spool tube or any other suitable drawing, pushing, or moving means) between the ground warp threads from one side to the other and then to the first side again and is then slid along into pile-forming position, said three threads are thereby mutually interlocked or coiled about each other in the manner required to form the Persian knot (as shown in the particular species therein).

The ground warp threads remain stationary, and all the coiling movement takes place entirely back from the free end of said color yarn, and this is accomplished by providing such holding means for the pair of ground warp threads with which the color yarn is to be knotted that said ground warp threads are crossed over each other between the two points where the color yarn passes between them, said two ground warp threads having a continuous space between them, however, which permits the color yarn to have free coiling movement lengthwise of said two ground warp threads as its two portions which project on the same side of the ground warp threads are moved together to form the tuft-ends of the Persian or other oriental knot. This holding means for the warp threads is herein shown as a needle-like device or tubular guide holder provided with a tortuous passage extending a sufficient distance to carry one thread laterally in one direction while the other thread is carried by a similar device laterally in the opposite direction to provide between them an opening for the passage of the color yarn between the two ground warp threads which are thus held laterally apart by said needle-like devices, said two holders or needle-like devices carrying the ground warp threads in opposite directions at their delivery ends so that said ground warp threads extend therefrom to the fell substantially parallel to each other, but are held in crossed-over position by said two holding devices between their laterally deflected or separated point where the color yarn is first passed through and the point where the ground warp threads emerge from or leave the two holding devices toward the fell. This construction is best shown in Figs. 9–11 and 16–20, where it will be seen that the holders 48, 49 are arranged in pairs, each having a deflected upper part to provide an opening 50 between them and having their upper delivery ends 51, 52 converged. In Fig. 12 the same construction is shown excepting that the lower part of each holder is in line with the upper or delivery end of the other holder of the same pair so that the warp threads reach the fell in different order from that in which they leave the warp roll. As shown in Figs. 9–11 (and Figs. 16–20), for instance, each holder is on the same side of its pair as its own upper or delivery end, so that the warp threads reach the fell in the same relative position that they leave the warp roll. The warp threads 18 enter or are engaged and held in alinement with the tortuous passage of the holding devices at any point below the opening 50, herein shown as below a transverse guide beam or member 53, where said needle-like devices are provided with a curved projecting throat 54 for facilitating the easy smooth entrance of the thread, this throat projecting rearwardly in line with the whip roll 17. The alternate holders are mounted to move vertically with relation to the others for the double purpose of accomplishing the shedding movement and to get out of the way of certain other moving parts of the mechanism, and accordingly the yarn holders 48 are mounted (see Figs. 1, 24, and 27) in a vertically sliding lifter or cross bar 55 and the holders 49 in a similar cross bar 56 actuated respectively by links 57, 58, arms 59, 60, rock shafts 61, 62, and cranks or cam levers 63, 64 whose cam rolls 65, 66 are actuated by path cams 67, 68 on the cam shaft 28. The sliding lifters 55, 56 are guided in guideways 69, 70 formed in the end frames. The spools 30 are the same in general construction and manner of use as usual Axminster spools, being provided with guide tubes and tube frames, but to accommodate them more readily to the functions required in the present loom, the tubes 71 are curved, as best shown in Fig. 7, and pointed or pinched to a relatively narrow edge as indicated at 72, in side elevation Fig. 7, and in rear elevation Fig. 8, so that they may find their way and pass through the opening 50 between the obliquely bent upper ends of the holders 48, 49 more readily. Also, they are so mounted with reference to the thread holders 48, 49 that they pass diagonally across the corner which is formed by the upper ends of said holders and the outgoing warp threads, as clearly shown in Figs. 1 and 3. The pinched end or projecting corner of the tube 71 also serves to prevent the contained yarn from getting accidentally positioned at that side or edge of the tube, or in other words the yarn is compelled to project from the middle or lower edge of the tube opposite said pinched edge, so that when the tube enters between the holders, this being facilitated as stated by the pinched edge or projecting corner, the projecting yarn is caught and deflected or brushed downwardly around the lower corner by the warp threads as soon as the free end of the tube enters between said warp threads in its forward movement. These tubes are secured in usual manner to a cross bar 73 of a carrying frame, but the latter differs from the usual tube frame in providing a pivotal connection with the chain carrier, said pivot being herein shown as consisting of a screw 74 passed loosely through the supporting plate 75 and threaded into a depending arm 76 of the support.

The supports 76 (one at each end of the tube frame) have inwardly projecting studs 77 at their lower ends to be engaged by the slotted upper end 78 of an actuator arm 79 rocked by a shaft 80 mounted at its ends in slides 81 vertically movable in guideways 82 in the end frames by links 83, Fig. 28, levers 84, rock shaft 85, and cam lever or crank 86 whose roll 87 travels in a path cam 88 on the shaft 28. Forward and back movement is given to the actuator arm 79 by links 89, Fig. 31, levers 90, rock shaft 91, cam crank 92 and cam 93. The parts 75 and 76 are normally held in the positions shown in Figs. 7 and 8 by a spring 94 on the part 76 whose bent free end (see Fig. 8) then occupies a notch or recess in the lower end of the part 75 (see Figs. 7 and 8), a lug or lip 95 on said part 75 acting as a stop to render it impossible for the tubes to turn back too far and serving also to hold the tubes rigid when subsequently positioning the knots at the fell, and the end supports, of which the end portions 76 are parts, are bent laterally at their upper ends 96 and thence downwardly at 97, and again laterally at 98, where they are fastened to the frame 73, thereby providing vertical spaces 99 to receive the wedge-shaped ends 100 of spool positioners 101, Figs. 3, 4, and 30, mounted to slide in slideways 102 and operated by rods 103, levers 104, rock shaft 105 and a cam lever or crank 106 whose roll 107 travels in a path cam 108 on the cam shaft 28. Thus, when the spool of previously selected yarn arrives at its operative position or lowest point of travel, as shown in Figs. 1 and 3, the positioners 101 move forward, thereby entering the spaces or slots 99, engaging the vertical ends 97 and thereby shoving the spool one way or the other into absolutely correct position so that its tubes 72 are brought into accurate alinement with the openings 50 of the holders 48, 49. The actuator arms 79 then swing the tubes on their pivots 74 from the normal dotted position, Fig. 3, to the full line position, Fig. 3, and, while this movement is taking place, the nippers are coming forward to engage the free yarn-ends which are projecting from the forward ends of said tubes. The nippers are herein shown as comprising a movable jaw 109 pivoted at its ends at 110 on hangers 111, and a relatively stationary jaw 112 carried by the lower ends of said hangers 111. The yarn-engaging edges of these two jaws are interlocked so as to bend the yarns and prevent their accidentally drawing out, the movable jaw being shown as provided with a longitudinal groove or recess 113 to coöperate with a ridge or projecting lip 114 on the stationary jaw. This nipper is directed in its movements by slides 115 moving in guide slots 116 and actuated by adjustable links 117, Fig. 26, rocker arms 118, rock shaft 119, cam lever 120, and path cam 121. A spring 122 tends to maintain the nipper jaws closed, said jaws being held open by the engagement of a tail piece or forwardly and upwardly projecting end 123 with the lower cam edge 124 of a cam plate or opening device 125 guided in vertical movements by a slide 126 and a guide slot 127 and actuated by a rod 128, Fig. 29, lever 129, shaft or stud 130, cam lever 131, and cam 132. The nipper moves rearward with its jaws held open by said cam until said jaws embrace the free ends of the yarns which have been put through the openings 50 of the warp thread holders and up through the parallel strands of warp threads to the position shown in Fig. 3, whereupon the nipper jaws are released by the cam 125 due to the combined upward movement of said cam and rearward movement of the nippers, thereby firmly engaging and holding all the color-yarn ends. Just as this takes place, the tubes begin swinging back again from the full line position, Fig. 3, toward their dotted line position. To prevent drawing out an undue length of strand or tuft yarn from the tubes, the nippers continue their rearward movement until the tubes have approximately reached their said dotted position, Fig. 3, said nippers being then in the position shown in Fig. 18, where they remain or dwell during certain succeeding movements of the tubes. The tubes, having reached their dotted line position, Fig. 3, are then raised so as to lift the color yarns or pile threads, and at the same time the holders 48, 49 are lowered (having been in raised position during the passage therethrough of said color yarns to the nippers), and when the raising of the tubes has lifted the yarns above said holders sufficiently to permit them to be moved forward, the tubes are swung forward, preferably by swinging the adjacent end of the chain forward. Said lifting operation is accomplished by a cam 133, Fig. 32, cam lever 134, rock shaft 135, arms 136, links 137, and levers 138, see also Figs. 1 and 2. These levers are fast on the rock shaft 35 to which the frame 34 is secured, which is provided at its rearwardly projecting end or extension 139 with counterbalance weights 140 for giving easy movement. The cam 133 has an additional lifting place 141 in its cam path for giving the chain an extra lift at the moment when the next spool is to be brought forward into weaving position. The forward swinging of the tube, tube frame and spool is herein shown as accomplished by adjustable links or rods 142 pivotally connected to the swinging frame or chain support 32 at 143, said rods being actuated by levers 144, see Fig. 25, a rock shaft 145, cam lever or crank 146 and cam 147 on the shaft 28.

The purpose of the upward and then forward movement of the yarn tubes and tube frame is to position the knot (which is simultaneously formed by the coöperating action of the warp-thread holders 48, 49), said tubes thus constituting one form of knot positioner and serving to deflect or slide the color yarns (whose forward ends are held by the nipper) into coiled position with relation to the parallel strands of ground warp threads adjacent the fell. When the free ends of the color yarns are first grabbed by the clamp or nipper and the tubes 71 are drawn back from full line position to dotted line position, Fig. 3, the color yarns extend straight back lengthwise of the loom with their forward ends extending between the raised parallel strands of warp threads upward to the nipper or clamp. However, as the tubes rise, thereby lifting the rear portions of said color yarns, said color yarns are coiled about said ground warp threads, the front portion of each color yarn being deflected in one direction by the bent upper end of the warp-thread holder 48 and the portion of said color yarn immediately therebehind being deflected in the opposite direction by the oppositely bent upper end of the holder 49, so that when the tube has finally raised said color yarn entirely above said holders and then moves forward, the desired two coils or bends of the color yarn around the two warp threads have been formed as shown in Fig. 15, the successive coiling movements being indicated in Figs. 18, 19, 20. These coils or partially formed knot are slid forward to the fell by the continued forward movement of the tube or knot positioner. At the same time the clamp or nipper is moving in the same direction, thereby drawing forward the free end of the knotted color yarn. At the same time the lay moves forward and its comb 148 beats up the tufted knot which has been tied, and the shearing mechanism also operates. The shearing mechanism comprises a shear blade 149 having a cutting edge 150 which is moved forward to coöperate with the upper rear edge 151 of the movable nipper jaw 109, said edges 150 and 151 constituting the two shearing edges of the severing mechanism. In order that the knotted tufts of color yarn may not spring out of place until bound in by the binder threads, I provide holding means. One end of each color yarn is held in place by the nippers as already explained, and the other end is likewise held by nipper-like devices, herein shown as formed integrally or as a part of the shearing mechanism, although it will be understood that the two functions are separate and may be carried out by separate mechanisms instead of by one mechanism as herein shown. Just below the shear edge 150, I provide a shoulder 152 to coöperate with a notch or recess 153 adjacent the shear edge 151 to catch the yarn just before it is severed and then bend and clamp the severed yarn immovably until after the shuttle 19 has laid in the binder filling. The blade 149 is carried by end slide blocks 154 in guideways 155 by adjustable links 156, Figs. 1 and 3, actuated by levers 157, rock shaft 158, cam lever 159 and cam 160.

The operation of the loom is as follows: The ground warp threads 18 are delivered from the warp beam 16 over a usual whip roll 17 to the take-up mechanism at the front of the loom, being deflected in pairs at the weaving region so as to form the openings 50 for the passage of the color yarns, by being passed through the ground-warp-thread holders or carrying and color-thread-twisting devices 48, 49, passing therethrough from the entrance throats 54 up through the tubular portions of the holders to and out at the crossed delivery ends 51, 52 respectively, and thence preferably parallel to the fell, and, in the completed fabric, over the breast beam to the take-up mechanism. Viewing my invention from a broad standpoint, the color yarns may be supplied by any suitable mechanism, being herein shown as delivered from the spools 30 through the tubes 71, each spool and its tubes being supplied with the complement of colors required according to the pattern being woven. These spools and tubes are brought forward by the spool-carrying chain and its operating mechanism in the manner well known in Axminster looms, whereby the particular color yarns are delivered in weaving position and then knotted individually about the warp threads in oriental knots.

When the pin-wheel mechanism 41, 42 moves the chain forward so as to bring the required spool 30 into weaving position at the lower end of the frame 32, the latter is dropped or lowered by the levers shown in Fig. 32, said bottom spool and its tube frame being accurately positioned by the forward movement of the positioners 101 into the end slots 99 of the tube frame and the upward movement of the actuators 79 into engagement with the lugs 77 of the tube frame. At the same time the warp thread holders 48, 49 are raised to the position shown in Figs. 1 and 3, the tubes 71 then being in the dotted line position Fig. 3. The actuator 79 is then swung forward by the mechanism shown in Fig. 31 until it reaches its full line position, Fig. 3. The result is that all the color yarns of said lowermost spool are passed through the openings 50 of the warp threads from the rear side to the front side of the holders 48, 49 and then up between the respective pairs of warp threads where the projecting free ends of said color yarns are instantly clamped by the nipper jaws 109, 112 which have been moving forward in open relation until in position to grab and clamp said free ends of the color yarn as shown in Fig. 3. Thereupon the tubes are swung back again by the actuators 79 and preferably the nipper or clamping member is moved rearwardly therewith (by the mechanism shown in Fig. 26), so as to prevent an undue amount of color yarn being withdrawn longer than is required for the tuft or pile being woven. The positioners 101 having meanwhile retreated, the spool is then lifted by the rising movement of its frame 32 (actuated by the mechanism shown in Fig. 32), thereby pulling all the color yarns up to the tops of the openings 50 and sliding them off from the overlapped ends 51, 52 of the warp-thread holders 48, 49 by the succeeding forward swinging movement of the spool and its frame 32, whereby each color yarn is knotted or coiled around its pair of warp threads, as shown in Figs. 15, 21, and 22. As the spool and its tubes continue forward, thereby positively sliding the coiled color yarns along the warp threads toward the fell, pulling the yarns upwardly and forwardly, the nipper at the same time pulls the other end of the knot forward, and as soon as the knot has been thus moved to the fell, the warp-thread holders 48, 49 are lowered (by the mechanisms shown in Figs. 24 and 27), thereby bringing the warp threads into correct position between the teeth of the beating-up comb 148, and then the latter beats up the knots. At the same time, the severing blade 149 is moved forward, the warp-thread holders 48, 49 being down out of the way and the spool and its tube frame and tubes being up out of the way, and simultaneously severs the knotted color threads from the tubes and holds the severed ends in clamped position. All the color yarns having now been completely knotted in place and the tuft ends of the knots clamped in place at the fell, the warp-thread holders 48 move down to their lowermost position and the warp-thread holders 49 move up to their uppermost position, thereby forming the desired shed for the shuttle to pass through, and then the fly shuttle is shot through, laying a strand of binder filling. As the lay comb 148 is moving forward in its beating-up movement, the warp-thread holders 48 and 49 are moved to their intermediate position (to facilitate the beating-up), the lay moves back, the holders 48 move upward and the holders 49 downward, and the fly shuttle is driven back through the shed, laying a second strand of binder filling, which is then beaten up. On the final beating movement of the lay, the shear 149 moves back to its position, Fig. 3, releasing the back tuft ends of the knots, and the cam plate 125 is lowered so that its edge 124 engages the tail piece 123 of the nipper to open the nipper, releasing the front tuft ends of said knots and holding the nipper jaws open ready for the next weaving operation. Meanwhile (and preferably just after the shearing operation), the spool-carrying chain 29 and its frame 32 have been raised, the chain advanced to bring the next color spool into lowermost position for weaving, and said frame swung back again in place to be dropped into the position shown in Fig. 3 ready for the next weaving operation as soon as the shear 149 has been moved back out of the way.

While, as already stated, my invention is broadly new in many respects and therefore is not to be restricted to the particular mechanism herein shown, and particularly to the Axminster-spool type of color selecting mechanism, it has many advantages in this latter relation. The common Axminster loom delivers the tuft yarns from the spool around the weft threads, whereas my invention not only delivers the tuft yarns around the warp threads, but delivers each tuft section or piece of tuft yarn around two warp threads, thereby showing the pattern on the back side. The chief advantage, however, is that my mechanism ties the tufts into the carpet or rug immovably, as distinguished from the usual Axminster weave, in which each tuft yarn is simply bent around one holding strand in an open-U shape. Also, by my invention, the knotting is accomplished at one continuous operation around both warp threads and the knot produced is the oriental knot, which is well recognized as the best. Not only is the pattern shown correctly on the back of the goods, but the back is smooth, even, pliable or soft, and the knots are practically immovable. A further advantage resides in the fact that the spools and tubes are not removed from the chain in the course of the weaving as has heretofore been the custom in Axminster looms. A further advantage of my invention is that, although weaving an oriental-knot fabric, it utilizes to a large extent the equipment at present found in the setting, spooling, and drawing-in departments of Axminster mills. Irrespective of whether the pattern yarns are provided by means of spools or other pattern-providing mechanism, the invention provides means for the continuous weaving of successive rows of knotted and coiled piles, all the ends of each row being formed simultaneously and the weaving continuing without stoppage of the loom between the knotting operations, the entire knotting being done by one thrust or forward movement (as distinguished from a plurality of back-and-forth movements), each row of piles is sheared evenly as it is woven, both pile portions of the knot-forming strands are accurately positioned in alinement with each other transversely of the loom at the fell before severing; the tuft-ends are positively held until the knots are bound in immovably, thereby rendering it impossible for the severed yarns to untwist, fly, tangle, or the like or snap back and drop out from the fabric, the oriental-knot weaving is accomplished in connection with ordinary fly shuttle mechanism for laying the binder filling, the knot weaving, or rather the formation of both coils of any given knot in each color yarn is automatically accomplished simultaneously for both coils, between the binder picks, or by one movement of the yarn for both coils about the two separate ground warp threads (which together constitute a complete knot), and the knots are made by manipulating the body of the yarn as distinguished from leading the end of the yarn in the required tortuous path around the warp threads to make the knot. Also, in view of the broadly novel character of the invention, I wish it understood that I am not limited to the mechanism herein shown as constituting the preferred embodiment of the invention, as various other embodiments may be resorted to without departing from the spirit and scope of my invention. For instance, in my co-pending application Serial No. 578,410, I have shown other mechanisms for carrying out the broad features of the invention. Among said other mechanisms there shown is, instead of using previously selected and wound spools, provision for accomplishing substantially the same weave in connection with pattern selective mechanism. Also accomplishing substantially the same weave (but with less range of color effect) with weft yarns for the oriental-knotted piles.

It will be understood that I have used the word "color yarn" not primarily to indicate that the yarn possesses a color characteristic, but to distinguish the coil forming yarn conveniently from the threads around which it is coiled, irrespective of whether said color yarns form actual piles or tufts or not in the woven fabric, and irrespective of whether they run lengthwise of the loom or transversely of the loom.

Having described my invention, what I claim as new and desire to secure by Letters Patent is:

1. In a loom, mechanism for supporting the ground warp threads for weaving, means for delivering color yarns with their free ends always in position to be moved between the warp threads, and coöperating knot-forming mechanism for moving each free end between a pair of warp threads and coiling the color yarn about said pair of warp threads to form an oriental knot, the aforesaid mechanisms including means for forming the knot-bends in the body of said color yarn independent of the ends of said color yarn, and means coöperating with said delivering means for positively holding the yarn gripped at each side of the knot-constituting part of the body during the entire bending operation.

2. In a loom, mechanism for supporting the ground warp threads for weaving, and coöperating knot-forming mechanism for coiling a color yarn about the ground warp threads to form a Persian knot, said two mechanisms including means for forming the knot-bends entirely in and with the body of said color yarn independent of the ends of said color yarn, said loom having means for positively engaging and holding said color yarn on both sides of said body portion next to the knot while the knot is being formed between the parts of the color yarn thus held, and means for laying binder thread while the color yarn is so held at both sides of the knot.

3. In a loom, mechanism for supporting pairs of ground warp threads approximately parallel to each other, means for delivering unattached color yarns and laying them lengthwise of and between the warp threads at each knotting operation, mechanism coöperating with the aforesaid mechanism and means to move each color yarn to the fell and thereby and simultaneously coil the same about the adjacent two ground warp threads in oriental-knot formation, and means for thereafter severing the knotted color yarns at the fell.

4. In a loom, knot-weaving bending and coiling mechanism to automatically and simultaneously perform all the knot-forming bending and coiling movements of a series of unattached color yarns about the ground warp threads with one forward movement of said color yarns, said mechanism including means to coil each color yarn about a pair of ground warp threads in an oriental knot, and binder-filling weaving mechanism for binding said woven color yarns and ground warp threads into a woven fabric.

5. In a loom, knot-weaving mechanism to automatically and simultaneously bend and coil a series of unattached color yarns about the ground warp threads with one forward movement of said color yarns, said mechanism including means to coil each color yarn about a pair of ground warp threads in an oriental knot, binder-filling weaving mechanism for binding said woven color yarns and ground warp threads into a woven fabric, and automatic cutting mechanism for severing and gripping the knotted color yarns while being bound.

6. In a loom, means to hold the free ends of a series of color yarns, means for supporting the opposite ends of ground warp threads, mechanism for accomplishing all the bending movements for knotting said series of color yarns about said ground warp threads between the supported ends of the latter while the free ends of said color yarns are so held, means for laying binder thread, and cutting means for severing the knotted yarns, whereby the knotted yarns are under the positive control of the holding means until after the knotting and binding thereof are completed.

7. In a loom, means to support the opposite ends of ground warp threads, and means to supply a series of color yarns, combined with mechanism for completing the weaving at the fell, including means to hold the free ends of said series of color yarns and means to move said holding means and the body of the color yarns forward to the fell, and cooperating means to knot said color yarns back from said free ends around said ground warp threads as the color yarns are being pulled to the fell.

8. In a loom, means to support the opposite ends of the ground warp threads, take-up mechanism to take up the fabric as it is woven and thereby maintain the fell at the same relative place in the loom, means adjacent the fell for weaving in binder filling, means for supplying a series of color yarns, and mechanism for tying said color yarns in oriental knots about said ground warp threads between said fell and the place where the binder filling is laid including means for holding, until after the laying of said binder filling, the end of the knotted color yarn which is next to the said binder filling being laid.

9. In a loom, means for supporting the opposite ends of ground warp threads, means for supplying a series of color yarns to be interknotted with said threads, and knotting mechanism, including warp-crossing means which also performs the shedding operation.

10. In a loom, means to deliver the warp threads in pairs to the fell, including a warp beam and means to permanently deflect said threads up-and-down adjacent the fell, take up means, and means for passing a color yarn at said deflected portion under one warp thread of a pair and over and then under the other warp thread and out between the two warp threads including means for holding the color yarn at both ends on either side of the knot, and means for thereafter laying binder thread.

11. In a loom, means for delivering the warp threads to the fell, including warp-thread holders arranged to maintain the warp threads in pairs substantially parallel adjacent the fell and to converge said threads back of said parallel portion, and means to deliver a color yarn between a pair of warp threads at each side of their convergent portion and about said threads at said convergent portion binder mechanism, said delivering means holding the color yarn at one side of the knot during the laying of binder thread, and means holding the yarn at the other side of the knot during said laying of binder thread.

12. In a loom, means for delivering the warp threads to the fell, including warp-thread holders provided with means for maintaining said threads, for a short distance, at approximately right angles to the general direction of the threads and woven fabric, and means to give said holders a shedding movement.

13. In a loom, means for delivering the warp threads to the fell, including warp-thread holders, provided with means for maintaining said threads, for a short distance, at approximately right angles to the general direction of the threads and woven fabric, the outgoing ends of said holders being angularly disposed with relation to each other, the holders being laterally separated from each other back from said outgoing ends.

14. In a loom, means for delivering the warp threads to the fell, including tubular holders permanently containing the threads, and means for shifting said holders lengthwise and thereby shifting the threads in accordance with the weaving requirements.

15. In a loom, means for supplying color yarns, means movable lengthwise of the ground warp threads for moving said color yarns in the weaving operation and warp-thread deflecting means, coöperating with said yarn-moving means to permit the latter, in said lengthwise movement, to pass by one continuous forward movement between pairs of ground warp threads from one side to the other and then back to the first side said warp-thread deflecting means providing a transfer of said pairs of threads between said two points of passage of the yarn-moving means from one side to the other.

16. In a loom, means for supplying color yarns, means movable lengthwise of the ground warp threads for moving said color yarns in the weaving operation, warp-thread deflecting means, coöperating with said yarn-moving means to permit the latter, in said lengthwise movement, to pass by one continuous forward movement between pairs of ground warp threads from one side to the other and then back to the first side said warp-thread deflecting means providing an exchange of position of said pairs of threads between said two points of passage, of the yarn-moving means, and yarn-shifting means for shifting said yarns along said warp threads past said intermediate place in the warp threads toward the fell.

17. In a loom, means for supplying color yarns, means movable lengthwise of the ground warp threads for moving said color yarns in the weaving operation, warp-thread deflecting means, coöperating with said yarn-moving means to permit the latter, in said lengthwise movement, to pass by one continuous forward movement between pairs of ground warp threads from one side to the other and then back to the first side said warp-thread deflecting means providing an exchange of position of said pairs of threads between said two points of passage, a clamping device for clamping the yarns adjacent the fell when thus passed between the warp threads, and yarn-shifting means for shifting said yarns along said warp threads past said intermediate place in the warp threads toward the fell.

18. In a loom, means for supplying color yarns, means movable lengthwise of the ground warp threads for moving said color yarns in the weaving operation, warp-thread deflecting means, coöperating with said yarn-moving means to permit the latter, in said lengthwise movement, to pass by one continuous forward movement between pairs of ground warp threads from one side to the other and then back to the first side said warp-thread deflecting means providing an exchange of position of said pairs of threads between said two points of passage, yarn-shifting means for shifting said yarns along said warp threads past said intermediate place in the warp threads toward the fell, and means for delivering binder filling behind said yarns after they have been thus moved toward the fell.

19. In a loom, means for supplying color yarns, means movable lengthwise of the ground warp threads for moving said color yarns in the weaving operation, warp-thread deflecting means, coöperating with said yarn-moving means to permit the latter, in said lengthwise movement, to pass by one continuous forward movement between pairs of ground warp threads from one side to the other and then back to the first side said warp-thread deflecting means providing an exchange of position of said pairs of threads between said two points of passage yarn-shifting means for shifting said yarns along said warp threads past said intermediate place in the warp threads toward the fell, operating means coöperating with the warp thread deflecting means to make a shed in said ground warp threads, and means to lay binder filling through said shed.

20. In a loom, means for supporting the ground warp threads at their opposite ends, a take-up, said supporting means maintaining said warp threads longitudinally immovable at all times excepting when moved forward by the take-up, means for laying binder thread, beating up means, mechanism for interweaving with the ground warp threads color yarns in oriental knots, and means for holding the color yarn at each side of each knot taut until after the laying of the binder thread.

21. In a loom, means to support ground warp threads, knot-tying mechanism for tying a color yarn around a pair of said warp threads, including power-operated means to move the free end of said color yarn lengthwise of and between said pair of warp threads, clamping means for holding the free end of the yarn while the knot is being tied therein, and coöperating means for completing the interweaving of said color yarn back of its said free end with said warp threads.

22. In a loom, means to support the warp threads at their opposite ends, means for supplying color yarns, and mechanism for interweaving the color yarns with the ground warp threads in a coiled knot, including means for passing each color yarn by a continuous unidirectional movement in the general direction of the length of the warp threads first between a pair of ground warp threads from one side to the other and then back to the first side thereof.

23. In a loom, means to support ground warp threads, means to supply a series of color yarns with their free ends in position for weaving, and weaving mechanism, including means movable lengthwise of and between said warp threads in the general direction of the warp threads to place said color yarns in weaving position, means for clamping the free ends of said yarns, and coöperating mechanism for knotting said yarns back of said clamping means about said threads in oriental knots while still held by said clamping means.

24. In a loom, means to support the ground warp threads at their opposite ends in pairs, means for supplying color yarns movable lengthwise of and between the warp threads to deliver each color yarn between the threads of one of said pairs, and knotting mechanism, including separate means to hold the opposite ends of each color yarn, and yarn-manipulating devices to intercoil said yarn with the pair of warp threads while the yarn is so held at its opposite ends.

25. In a loom, means to support the ground warp threads at their opposite ends in pairs, means for supplying color yarns movable lengthwise of and between the warp threads to deliver each color yarn between the threads of one of said pairs, and knotting mechanism, including separate means to hold the opposite ends of each color yarn, and yarn-manipulating devices to coil each yarn in an oriental knot about the two warp threads of a pair while so held at its opposite ends.

26. In a loom, means to support the warp threads at their opposite ends, and knot-forming mechanism, including as a part of the forming mechanism a knot-positioner to deflect and coil the yarn being knotted and also to move the knot to the fell.

27. In a loom, means for weaving oriental knots, comprising warp-thread holders, means for delivering a color yarn in position to be knotted, and a knot positioner movable lengthwise of the warp threads, said warp-thread holders coöperating with said positioner to coil the color yarn about the warp threads as said yarn is moved by said positioner lengthwise of the warp threads.

28. In a loom, means to support the warp threads at their opposite ends, means to deliver a series of color yarns, knot-forming mechanism to knot said color yarns into the fabric, including means for holding both ends of the knotted yarn until after the severing, severing mechanism to sever said yarns at the fell after each knotting operation, and actuating means for restoring the severed ends of the color yarns back to position for further weaving.

29. In a loom, means to support the ground warp threads, a source of color yarn supply, provided with means for delivering the color yarns into weaving position, coöperating means for intercoiling said color yarns with the warp threads, and operating means for moving said yarn supply and delivering means lengthwise of the warp threads, approximately to the fell, for aiding in the tying of the knots in the color yarn about the warp threads.

30. In a loom, means to support the ground warp threads, a source of color yarn supply, provided with means for delivering the color yarns into weaving position, clamping means for receiving and holding the free ends of the color yarns as they are delivered in weaving position, coöperating means for intercoiling said color yarns with the warp threads, and operating means for moving said yarn supply and delivering means lengthwise of the warp threads, approximately to the fell, for aiding in the tying of the knots in the color yarn about the warp threads.

31. In a loom, means to support the ground warp threads, a source of color yarn supply, provided with means for delivering the color yarns into weaving position, clamping means for receiving and holding the free ends of the color yarns as they are delivered in weaving position, coöperating means for intercoiling said color yarns with the warp threads, operating means for moving said yarn supply and delivering means lengthwise of the warp threads, approximately to the fell, for aiding in the tying of the knots in the color yarn about the warp threads, and means for severing the knotted color yarns while so held.

32. In a loom, means to support the ground warp threads, a source of color yarn supply, provided with means for delivering the color yarns into weaving position, clamping means for receiving and holding the free ends of the color yarns as they are delivered in weaving position, coöperating means for intercoiling said color yarns with the warp threads, operating means for moving said yarn supply and delivering means lengthwise of the warp threads, approximately to the fell, for aiding in the tying of the knots in the color yarn about the warp threads, and means for fastening the knotted color yarns with binder thread while the ends of the knotted color yarns are still held fast.

33. In a loom, means to support the ground warp threads at their opposite ends, knotting mechanism to interweave a series of color yarns with said ground warp threads across the loom, coöperating means for holding each knotted yarn at each side of the knot, severing mechanism, means to beat up the knots to the fell while both ends of each knot are still held, and means for laying-in a binder filling after the ends are beaten up but still positively held.

34. In a loom, means to support the ground warp threads, means to supply color yarns to be interwoven with said threads, weaving mechanism to coil a color yarn around a pair of warp threads, including means to deliver each color yarn with a forward movement in the direction of the length of the warp threads into weaving position with relation to and between said pair of warp threads, and means to engage and hold the free end of said color yarn while said delivering means moves back again and during the completion of the weave.

35. In a loom, means to support the ground warp threads in position for weaving, means for delivering a series of color yarns into position to be interknotted with said warp threads, a nipper to grip the free ends of said color yarns, a filling device for laying binder filling for binding the fabric before the ends of the knotted yarn are released, and automatic severing mechanism timed to sever the color yarns before the binder filling is laid and while said free end is stilled gripped.

36. The combination with a loom, of a color-yarn spool and its yarn guide tubes, provided with an end bearing plate, and a transversely moving positioner for engaging said plate and thereby positioning said tube transversely of the loom into accurate weaving alinement.

37. The combination with a loom, of a color-yarn spool, its yarn guide tubes and tube frame pivotally mounted concentrically of the spool and to turn with the spool, and means for turning said spool tubes and tube frame on their pivot.

38. The combination with a loom, of a color-yarn spool, a carrier chain for moving said spool into and out of weaving position, and yarn guide tubes and a tube frame connected to said spool, said spool and tube frame being pivotally mounted on said chain.

39. The combination with a loom, of a carrier chain, a series of color yarn spools mounted thereon and carried by said chain into and out of weaving position, yarn guide tubes for each spool, means coöperating with said guide tubes to interweave the color yarns into the fabric, and means to move said chain and its spools and tubes lengthwise of the loom and to pivotally swing said tubes on said chain in the said weaving operation.

40. The combination with a loom, of a carrier chain, a series of color yarn spools mounted thereon and carried by said chain into and out of weaving position, yarn guide tubes for each spool, means coöperating with said guide tubes to interweave the color yarns into the fabric, and means to move said chain and its spools and tubes lengthwise of the loom and up and down and means to move said tubes with relation to the chain when down in the said weaving operation.

41. In a loom, means for supporting the warp threads, including means to form an angular bend in the individual threads at the weaving region of the loom, a color yarn spool and its tubes, and means for moving said tubes in the weaving operation between said warp threads from one side of the web to the other and back to the starting side at said deflected angle.

42. In a loom, means for supporting the warp threads, including means for deflecting said threads angularly at the weaving region of the loom, a color yarn spool and its tubes, and means for moving said tubes in the weaving operation between said warp threads obliquely across said angle from one side of the web to the other and thence to the starting side.

43. In a loom, means for supporting the warp threads, a color yarn spool and its tubes, and mechanism for moving said tubes, in the weaving operation, back and forth between the warp threads and from the top to the bottom of the web, said tubes being curved lengthwise in a vertical plane lengthwise of the loom for facilitating said operation.

44. In a loom, means for supporting the warp threads in weaving position, including tubular holders for deflecting said warp threads at the weaving region of the loom, a color yarn spool and its tubes movable into position for the tubes to enter between said holders, said tubes having projecting ends wedge-shaped in cross section to facilitate their entrance between said holders.

45. In a loom, means for supporting the warp threads, a color yarn spool and its tubes, and mechanism for moving said tubes, in the weaving operation, back and forth between the warp threads, each tube being provided with means at its free end for tending to move the yarn located in the lower side thereof and preventing said yarn from occupying the upper side of said free end, thereby facilitating the proper positioning of the yarn-end by the brushing action of the warp threads when the tube-end is moved between the warp threads in the weaving operation, said moving mechanism halting the tube-ends at one side of the web in position to hold said brushed yarn-ends substantially lengthwise of the warp threads, and means for then gripping said yarn-ends while so held.

46. In a loom, means for supporting the warp threads in stationary position during the weaving operation, means for delivering a series of yarn-ends in position to be woven into the fabric, clamping mechanism for simultaneously grabbing all of said yarn-ends, automatic operating means for said clamping mechanism, and coöperating mechanism timed to operate immediately after the clamping operation for bodily moving the color yarns in coils about said stationary warp threads while so clamped.

47. In a loom, means for supporting the warp threads in weaving position, means for delivering a series of color yarns in position to be woven into the fabric, clamping mechanism for simultaneously grabbing all of the yarn-ends and maintaining engagement therewith during the interweaving of said yarns, and operating means for said clamping mechanism, including means for moving the clamping mechanism and the yarn-ends still held thereby longitudinally of the warp threads toward the fell while the color yarns are being interwoven with said warp threads.

48. In a loom, means for supporting the warp threads in weaving position, means for delivering a series of color yarns in position to be woven into the fabric, clamping mechanism for simultaneously grabbing all of the yarn-ends and maintaining clamping hold of said ends until the interweaving of said yarns is finished, and operating means for said clamping mechanism, including means for moving the color yarns bodily longitudinally of the warp threads while the color yarns are being interwoven therewith.

49. In a loom, means for supporting the warp threads in weaving position, means for delivering a series of yarn-ends in position to be woven into the fabric, and shearing mechanism operating at the fell, comprising means for clamping the yarns adjacent that point of the yarn where said yarn is to be sheared and then severing the yarn at said point, whereby the yarn is cut and held at the fell against any possibility of escaping when sheared.

50. In a loom, means for supporting the warp threads in weaving position, means for delivering a series of yarn-ends in position to be woven into the fabric, clamping means to clamp the free ends of the yarns, and combined clamping and shearing mechanism to clamp and then shear the yarns at a point between the warp threads and the yarn supply.

51. In a loom, means for supporting the warp threads in weaving position, means for delivering a series of yarn-ends in position to be woven into the fabric, clamping means to clamp the free ends of the yarns, and operating to clamp said yarns at the beginning of the weaving, and combined clamping and shearing mechanism to clamp and then shear the yarns, at the end of said weaving.

52. In a loom, means for supporting the warp threads in weaving position, and weaving mechanism to interweave color yarns with said warp threads, means for clamping and holding the free ends of said color yarns, operating to clamp said yarns when in initial weaving position, said weaving mechanism including means for deflecting said color yarns when in substantially final weaving position, and automatic means for severing said color yarns, while so held deflected at a point, between said deflecting means and the fabric.

53. In a loom, means for supporting the warp threads in weaving position, and weaving mechanism to interweave color yarns with said warp threads, means for clamping and holding the free ends of said color yarns, operating to clamp said yarns when in initial weaving position, said weaving mechanism including means for deflecting said color yarns when in substantially final weaving position, means to clamp said color yarns, while thus deflected, at a point between the deflecting means and the fabric, and automatic severing means to sever the color yarns at a point between said deflecting means and said last mentioned clamping means.

54. In a loom, means for supporting the warp threads in weaving position, and weaving mechanism to interweave color yarns with said warp threads, means for clamping and holding the free ends of said color yarns, operating to clamp said yarns when in initial weaving position, said weaving mechanism including means for deflecting said color yarns when in substantially final weaving position, beating up means for beating up the color yarns when woven into the fabric, automatic means to clamp said color yarns, while thus deflected, at a point between the deflecting means and the fabric, and severing means to sever the color yarns at a point between said deflecting means and said last mentioned clamping means.

55. In a loom, means for supporting the warp threads in weaving position, and weaving mechanism to interweave color yarns with said warp threads, means for clamping and holding the free ends of said color yarns, operating to clamp said yarns when in initial weaving position, said weaving mechanism including means for deflecting said color yarns when in substantially final weaving position, beating up means for beating up the color yarns when woven into the fabric, means to clamp said color yarns, while thus deflected, at a point between the deflecting means and the fabric, automatic severing means to sever the color yarns at a point between said deflecting means and said last mentioned clamping means, and automatic means for laying binder filling.

56. In a loom, means for supporting the warp threads in weaving position, and weaving mechanism to interweave color yarns with said warp threads, means for clamping and holding the free ends of said color yarns, operating to clamp said yarns when in initial weaving position thereof, said weaving mechanism including means for deflecting said color yarns when in substantially final weaving position, beating up means for beating up the color yarns when woven into the fabric, means to clamp said color yarns, while thus deflected, at a point between the deflecting means and the fabric, severing means to sever the color yarns at a point between said deflecting means and said last mentioned clamping means, and automatic means for laying binder filling after the color yarns are severed but while the woven portions thereof are still clamped at their opposite ends.

57. In a loom, means to hold the warp threads at their opposite ends in weaving position side by side throughout the fabric across the loom, means for supplying color yarns to be woven into the fabric, and coöperating oriental-knot tying mechanism for simultaneously coiling said color yarns about all of said warp threads entirely across the fabric while the warp threads are longitudinally stationary.

58. In a loom, means for delivering the warp threads to the fell, including an axially stationary tubular holder through which the warp thread is adapted to move, having its outgoing end offset and a bend formed in the body thereof adjacent said end, combined with means coöperating with said end and bend for delivering a color yarn in weaving relation to the warp threads.

59. In a loom, means for delivering the warp threads to the fell, including tubular holders arranged in pairs through which the warp threads are adapted to pass, the tubes of each pair having their outgoing ends offset past each other, when looking lengthwise of the loom, and having a color-yarn receiving opening or passage formed between them back from said offset ends, and means for delivering a color yarn through said opening and between the pair of warp threads passing out from said offset ends of the holders.

60. In a loom, means for delivering the warp threads to the fell, including tubular holders arranged in pairs through which the warp threads are adapted to pass, the tubes of each pair having their outgoing ends offset past each other, when looking lengthwise of the loom, and having a color-yarn receiving opening or passage formed between them back from said offset ends, and means for delivering a color yarn through said opening and between the pair of warp threads passing out from said offset ends of the holders, the holders of each pair being separated from each other from said opening outward to provide a free passage for the escape of the color yarn lengthwise of the holder from said opening past said offset ends.

61. In a loom, means for delivering warp threads to the fell, including tubular holders through which the warp threads pass, arranged in pairs, each pair having a color-yarn receiving opening formed between them by a deflection of said tubes past each other in one direction at the outgoing ends of the tubes whereby the latter are offset, viewing the loom lengthwise, and by a deflection of the tubes past each other in an opposite direction at the opposite end of said opening, and means for delivering a color yarn through said opening and between the pair of warp threads passing out from said offset ends of the holders.

62. In a loom, means for delivering warp threads to the fell, including tubular holders through which the warp threads pass, arranged in pairs, each pair having a color-yarn receiving opening formed between them by a deflection of said tubes past each other in one direction at the outgoing ends of the tubes whereby the latter are offset, viewing the loom lengthwise, and by a deflection of the tubes past each other in an opposite direction at the opposite end of said opening, and means for delivering a color yarn through said opening and between the pair of warp threads passing out from said offset ends of the holders, the holders of each pair being separated from each other from said opening outward to provide a free passage for the escape of the color yarn lengthwise of the holder from said opening past said offset ends.

63. In a loom, means for delivering the warp threads to the fell, including tubular holders through which the warp yarns pass, angularly disposed with relation to the general direction of the warp threads, each holder having a curved throat opening rearwardly for the entrance of the warp thread and a curved outgoing end opening forwardly toward the fell for the delivery of the warp thread.

64. In a loom, means for delivering the warp threads to the fell, including two sets of tubular holders through which the warp yarns pass, angularly disposed with relation to the general direction of the warp threads, and operating means for moving said sets dissimultaneously.

65. In a loom, means for delivering the warp threads to the fell, including two sets of tubular holders through which the warp yarns pass, angularly disposed with relation to the general direction of the warp threads, a cross bar for supporting each set, guides for said cross bars, and reciprocators for moving the cross bars in said guides.

66. In a loom, means for supporting the warp threads, including angularly disposed holders through which said threads pass, means for inserting color yarns between said warp threads at said angular region, clamping means for engaging the free ends of the yarns at the side of said angular region opposite to that from which the yarns were delivered, means coöperating with the aforesaid mechanism to deflect a rearward portion of the color yarns into substantially parallel relation to said clamped ends of said yarns, and means for severing and clamping the deflected yarn portions in said position and relation.

67. In a loom, means for supplying ground warp threads in pairs, and weaving mechanism, including color yarn delivering devices movable lengthwise of said warp threads, and coöperating warp holding means and operating means for said color yarn delivering devices for passing a delivering device and its yarn in a general direction lengthwise of the warp threads from one side of the web to the other side thereof and out to the first side again, said device in going from one side passing transversely between a pair of warp threads so that it is next to their contiguous or inner sides and in going from the other side passing each of said two warp threads on its diametrically opposite side.

In testimony whereof, I have signed my name to this specification, in the presence of two subscribing witnesses.

THOMAS P. WALSH.

Witnesses:
 Geo. H. Maxwell,
 M. J. Spalding.

It is hereby certified that in Letters Patent No. 1,072,885, granted September 9, 1913, upon the application of Thomas P. Walsh, of Boston, Massachusetts, for an improvement in "Looms for Weaving Oriental Knotted Fabrics," errors appear in the printed specification requiring correction as follows: Page 10, line 110, for the word "stilled" read *still;* page 12, line 86, strike out the word "thereof;" and that the said Letters Patent should be read with these corrections therein that the same may conform to the record of the case in the Patent Office.

Signed and sealed this 7th day of October, A. D., 1913.

[SEAL.] R. T. FRAZIER,

*Acting Commissioner of Patents.*